US008850042B2

(12) United States Patent
Terrill (10) Patent No.: US 8,850,042 B2
(45) Date of Patent: Sep. 30, 2014

(54) CONTACT DETAILS SERVICE (75) Inventor: Bernard James Terrill, Docklands (AU)

(73) Assignee: Accenture Global Services Limited, Dublin (IE)

( * ) Notice: Subject to any disclaimer, the term of this patent is extended or adjusted under 35 U.S.C. 154(b) by 612 days.

(21) Appl. No.: 12/613,037

(22) Filed: Nov. 5, 2009

(65) Prior Publication Data

US 2010/0115115 A1 May 6, 2010

Related U.S. Application Data (63) Continuation of application No. PCT/AU2008/000635, filed on May 7, 2008.

(30) Foreign Application Priority Data

May 7, 2007 (AU) ................................ 2007902411

(51) Int. Cl.
*G06F 15/16* (2006.01)
*G06Q 10/10* (2012.01)

(52) U.S. Cl.
CPC ...................................... *G06Q 10/10* (2013.01)
USPC ............................ 709/229; 709/206; 709/207

(58) Field of Classification Search
CPC . G06Q 10/10; G06F 17/30876; G06F 17/243; G06F 21/62
USPC .......................................................... 709/229
See application file for complete search history.

(56) References Cited

U.S. PATENT DOCUMENTS 5,327,529 A * 7/1994 Fults et al. ..................... 715/762
6,236,996 B1 5/2001 Bapat et al.
6,480,850 B1 * 11/2002 Veldhuisen ................... 707/610

(Continued)

FOREIGN PATENT DOCUMENTS

WO WO 02/25403 3/2002
WO WO 2007/050884 5/2007

OTHER PUBLICATIONS

Frank Vahid, "The Softening of Hardware," Computer, vol. 36, No. 4, pp. 27-34, Apr. 2003, doi:10.1109/MC.2003.1193225.*

(Continued)

*Primary Examiner* — Phuoc Nguyen
*Assistant Examiner* — June Sison
(74) *Attorney, Agent, or Firm* — Fish & Richardson P.C.

(57) ABSTRACT

A method for a user to advise related entities with respect to a consumer service of their contact details wherein the user submits data to a Contact Details Registration Service to register their use of the consumer service; the Contact Details Registration Service allocating the user with a unique identification indicia and transmitting same to the user for subsequent use in communications with the Contact Details Registration Service and/or any related entities of the consumer service registered with the Contact Details Registration Service; the data submitted by the user including their contact details and having at least an address to which correspondence is to be sent, the contact details being associated with the unique identification indicia of the user by the Contact Detail Registration Service and stored in a database; and the user's contact details being accessible to the consumer service, or related entities thereof, upon provision of the user's associated unique identification identifier to the Contact Details Registration Service database, wherein the Contact Details Registration Service database maintains a record of related entity requests for the contact details of the user.

24 Claims, 4 Drawing Sheets (56) References Cited

U.S. PATENT DOCUMENTS

| | | | |
|---|---|---|---|
| 6,523,116 B1* | 2/2003 | Berman | 713/182 |
| 6,701,348 B2* | 3/2004 | Sommerer | 709/206 |
| 6,870,921 B1* | 3/2005 | Elsey et al. | 379/218.01 |
| 7,206,998 B2* | 4/2007 | Pennell et al. | 715/224 |
| 7,617,125 B1* | 11/2009 | Light et al. | 705/26 |
| 2007/0130101 A1* | 6/2007 | Anderson et al. | 707/1 |
| 2007/0157108 A1* | 7/2007 | Bishop | 715/771 |
| 2008/0028228 A1* | 1/2008 | Mardikar et al. | 713/184 |
| 2009/0172183 A1* | 7/2009 | Derksen et al. | 709/232 |
| 2009/0300097 A1* | 12/2009 | Meyer | 709/203 |

OTHER PUBLICATIONS

Steve McConnell, "Who Needs Software Engineering?," IEEE Software, vol. 18, No. 1, pp. 5-8, Jan./Feb. 2001, doi:10.1109/MS.2001.903148.*

Andrew Tanenbaum, Structured computer organization; (2nd ed.), Prentice-Hall, Inc., Upper Saddle River, NJ, 1984.*

PCT Notification of Transmittal of International Preliminary Report on Patentability, International Application No. PCT/AU2008/000635, mailed Sep. 17, 2009 (19 pages).

Chinese Office Action for Application No. 200880014995.X, dated Oct. 10, 2011 (8 pages. English language translation.).

* cited by examiner

CONTACT DETAILS SERVICE

CROSS-REFERENCE TO RELATED APPLICATIONS

This application is a continuation of International Application No. PCT/AU2008/000635, filed May 7, 2008, which claims priority to Australian Application No. 2007902411, May 7, 2007, both of which are incorporated herein by reference.

FIELD OF THE INVENTION

The invention relates generally to a system, method, computer software program and product to accurately maintain contact details of users of a consumer service. The invention is particularly well suited to accurately record the details of all related entities that are related to the user by the consumer service thus allowing users to alert all related entities of a change to their contact details or at least allow users to review a record of all related entities.

BACKGROUND OF THE INVENTION

For various reasons, including the increasingly transient nature of employment, people are generally finding that they have a need to change one or more of their contact details on an increasingly regular basis.

For example, amongst the younger recently employed generation, it is not unusual for home ownership to be delayed with housing needs satisfied by rental accommodation. For older generations, with employment arrangements usually only lasting two to three years before either a change in employment or change in location occurs, contact details are also more frequently in need of updating as compared with generations past.

A particularly good example of this problem occurs when users of a postal service change their address and it becomes necessary to provide the new address details to every entity that has previously sent, or may need to send, postal items to the user. To address this problem, postal services around the world usually provide a "change of address" service wherein a user completes a change of address form, lodges it with the postal service and all postal items directed to the user at their old address are intercepted and redirected to the new address. This is usually effected by the postal service intercepting postal items to the user's old address and the application of an adhesive label to the postal item with the user's new address. Generally, users will request the "change of address" service to be implemented for a sufficiently long period of time to enable them to formally advise their new address details to all related entities that have a record of their old address. Of course, there are entities that will regularly send postal items to the user and whilst the "change of address" service is implemented by the postal service, the user will receive redirected items of post from that entity which will act as a reminder to the user to formally advise that entity of their new address details.

However, there are entities that will send postal items on an irregular and/or infrequent basis and hence may not send an item of post to the user whilst the "change of address" service is in effect with the postal service. In order to reduce instances of neglecting to notify all related entities, the user may implement the "change of address" service for an extended period of time (e.g. more than twelve (12) months) in order to provide a sufficient period of time in which to receive postal items from entities that may only send items of mail to them on an irregular and/or infrequent basis. In some instances, users maintain their own lists of entities to notify in the event of a change of address to avoid implementing a re-direction service.

The usual "change of address" services offered by postal systems are clearly problematic in that there is a cost associated with requesting and implementing a "change of address" service and the longer the period of time that this service is in effect, the greater the cost to the user. Further, unless the user implements the "change of address" service for a substantially long period of time, there is always a risk that they will neglect to formally advise one or more related entities of their change of address details. Further, users may need to commit a substantial amount of time and effort advising all the related entities of their change of address which can involve completing different forms and procedures for each entity.

The ineffectiveness of current "change of address" services is also problematic for organizations that seek to send items of post to users as part of their usual communication or for marketing purposes. In some instances, users may have elected to receive information by post of events and/or products/services that would be of interest to them. This type of postal item is a particularly good example of an item that would be sent to a user on an irregular and/or infrequent basis and it is in the best interest of the organization to be aware of the user's new address as any marketing information or literature that is sent to the wrong person or address represents an unnecessary cost to the organization that they seek to minimize.

The present arrangements for organizations to record a users change of address is also problematic with respect to the cost and likelihood of error associated with manual entry of data. When a user submits change of address details, effort, and hence cost, is incurred processing the new details. For example, when new details are advised by post, the organization is required to open the envelope, process the correspondence and pass it to the appropriate personnel to manually alter the organizations' computer records to reflect the user's new details. Clearly, for organizations that receive a large number of requests to change users details, the cost can be significant.

In an attempt to address this problem, some postal services around the world provide a list of organizations to users that the postal service will advise of a change to their address details. Unfortunately, the list is usually relatively short and only comprises those organizations that have entered into a specific arrangement with the postal service to enable the transfer of new address details electronically. Further, each organization on the list that a user can select may require additional and/or different information to identify the user to the organization. This could take the form of a membership number or a policy number, etc.

Accordingly, the usual service offering by postal systems to alert related entities of a user's change of address details fails to effectively address the problem and does not provide a user with a list of all related entities (whether individual users or organizations) that have previously sent, or may need to send, items of post to them, and continues to require a substantial amount of time and effort on the part of the user.

Any discussion of documents, acts, materials, devices, articles or the like which has been included in this section of the present specification is solely for the purpose of providing a context for the present invention. It is not to be taken as an admission that any or all of these matters form part of the prior art or were common general knowledge in the field of the invention as it existed before the priority date of any of the claims herein.

SUMMARY OF THE INVENTION

In one aspect, the present invention provides a method for a user to advise related entities with respect to a consumer service of their contact details wherein the user submits data to a Contact Details Registration Service to register their use of the consumer service; the Contact Details Registration Service allocating the user with a unique identification indicia and transmitting same to the user for subsequent use in communications with the Contact Details Registration Service and/or any related entities of the consumer service registered with the Contact Details Registration Service; the data submitted by the user including their contact details and having at least an address to which correspondence is to be sent, the contact details being associated with the unique identification indicia of the user by the Contact Detail Registration Service and stored in a database; and the user's contact details being accessible to the consumer service, or related entities thereof, upon provision of the user's associated unique identification identifier to the Contact Details Registration Service database, wherein the Contact Details Registration Service database maintains a record of related entity requests for the contact details of the user.

A related entity with respect to a consumer service may be any type of entity including an individual user or any type of organization that requires, or may require, the user's contact details. In some instances, a related entity may make use of the same consumer service and in other instances they may be a service provider to the consumer service.

When a user changes their contact details or prefers correspondence to be delivered to an alternative address, the user may submit a request to the Contact Details Registration Service database to alter their former contact details and upon so doing, the unique identification indicia is then associated with the user's new contact details.

In another aspect, the present invention provides a method for a user to advise related entities with respect to a consumer service of a change of their contact details where the user and related entities have registered their contact details with a Contact Details Registration Service wherein: the user establishes electronic communication with the Contact Details Registration Service database and provides their unique identification indicia that was previously assigned to the user and which has been used in communication between the user and related entities; upon being presented with a display that includes their contact details, the user alters the contact details that they require changed; the altered contact details of the user being associated with the user's unique identification indicia; and the user's altered contact details being accessible to the consumer service, or related entities thereof, upon provision of the user's associated unique identification identifier to the Contact Details Registration Service database, wherein the Contact Details Registration Service database maintains a record of related entity requests for the contact details of the user.

In the instance of the consumer service being a postal service, use of the unique identification indicia instead of a physical address enables users to request items of post be delivered to their physical address without divulging same to a related entity that proposes to send correspondence to the user. More importantly, the proposed sender may access the Contact Details Registration Service database to obtain the latest physical address details. The Contact Details Registration Service may be offered as an independent service which may be accessed directly or through a service offered by a postal service/consumer service.

Preferably, related entities in the form of proposed senders register with the identification service and/or the postal service and are subject to security checks before obtaining access through secure authorized access arrangements that are established for the proposed sender.

As a result of allocating a unique identification indicia to each user of the service, when a user completes a form or any document relating to the service, they only need to include their unique identification indicia rather than complete the formal document with their full contact details including their full physical address details. This reduces the potential for errors on the part of the user completing the form and/or documents, reduces the time required to complete the document and significantly reduces the data entry requirement for the postal service and/or any related entity.

Again, in the instance of the consumer service being a postal service, when a sender is seeking to send an item of post to a user it is envisaged that the sender receives the user's unique identification indicia and then accesses the Contact Details Registration Service database by use of a data communications network in order to obtain the user's physical address details. Upon satisfying all the required security checks, the submitted request for the physical address details that are associated with a unique identification indicia is considered. The sender then receives the physical address details and addresses the postal item to the user at that address according to their usual process and practices.

In one embodiment, until the point in time that a sender proposes to send an item of post they may elect to only use the unique identification indicia internally which helps to protect the user's privacy. At the time of actually sending an item of post to the user, the sender then obtains the physical address from the Contact Details Registration Service database.

Some entities may elect to record a user's name along with their unique identification indicia as a basic cross check to ensure that the correct unique identification indicia has been associated with the correct user. The identification service retains a record of all entities that have requested the physical address details for a particular unique identification indicia thus enabling the user to review that record. Accordingly, the user is able to ascertain which entities have accessed, or attempted to access, their physical address details.

As a record is maintained, a user is able to obtain a list of senders who have sent items of post to the user, or at least requested the user's contact details, and when changing their physical address details with the registration service, the user can request a list of each related entity and may use this list to formally advise the related entities of the change to their contact address details. In some instances, a user may elect to exclude certain entities from the formal advice regarding the change to their contact details. In these circumstances, the entity may simply be advised that user has changed their contact details and postal items should no longer be sent to that user's previous physical address.

In another embodiment, all included related entities (all included senders) who have previously sent items of post to the user, are notified of the user's new contact details and their new physical address.

In one embodiment, the entity that requires contact details of the user (Contact Detail Recipient (CDR)) connects to the Contact Details Registration Service by use of a data communications network and submits the unique identification indicia to the Contact Details Registration Service by using a communication protocol such as a web service call with the unique identification indicia as one of the web service call parameters. Assuming that the CDR is a recognised and authorized entity for the purpose of obtaining user's contact details, the relevant contact details are provided to the CDR. In this embodiment, this particular transaction is recorded and acts as the means by which a record of all CDR's for a particular user are identified and recorded. Of course, it is clearly advantageous if CDR's are required to undergo a registration process themselves with the Contact Details Registration Service such that the CDR may be readily identified by the Contact Details Registration Service at the time the CDR causes the web service call to the Contact Details Registration Service.

In another embodiment, all of the user's communications with the Contact Details Registration Service also occur over a data communications network and are also effected by web based protocols. Of course, initial registration with the Contact Details Registration Service could occur by the user attending the premises of the Contact Details Registration Service provider where they may provide proof of identity to the service provider at the time of requesting registration. In any event, a user registers their details with the Contact Details Registration Service and receives their unique identification indicia which is subsequently used in place of their full contact details for subsequent communications with the Contact Details Registration Service. Similarly, in this embodiment, when the user changes one or more of their contact details, they may access the Contact Details Registration Service over a data communications network and alter any of their contact details as necessary. At the time of altering one or more of their contact details, the user may be presented with a list of all entities (CDR's) that have previously obtained their contact details from the Contact Details Registration Service. In the instance of a change to the user's physical address, the user may be presented with a list of all CDR's that have previously obtained the user's physical address details. At this point, the user may then select those particular CDR's that they consider should be notified of the change of their contact details. In one embodiment, the default condition is to notify all CDR's of the change to the user's contact details and the user may then select specific CDR's to remove from the list of CDR's to be notified. The notification to CDR's of the change to the user's contact details is then effected by the Contact Details Registration Service and may be implemented by a range of options including the transmission of an electronic mail message or a web service call similar to that used by the CDR to obtain the user's contact details. Of course, the particular contact detail change can be used to derive a relevant list of CDR's who have previously requested that particular type of contact detail that has been altered. Of course, any entity that has yet to request the user's contact details will receive the up-to-date details at the time of submitting a request and accessing same from the Contact Details Registration Service database.

Preferably, any notification to CDR's of the change to a user's contact details, or the obtaining of same by a CDR, is effected with a minimum of manual human effort to reduce the potential for errors and to reduce the human labour requirement with respect to this task.

In another embodiment, organizations that make use of the Contact Details Registration Service for the purpose of obtaining users' contact details indicate their participation with the service by use of a graphical icon that appears on paper and on-line forms. In the event that a user is completing a form for an organization that utilises the Contact Details Registration Service, the user, upon recognising the graphical icon may elect to only enter their unique identification indicia on the form thus not requiring the user to complete all of the fields in which the organization requests contact details.

In the case of submitting details by telephone, organizations that have previously registered with the Contact Details Registration Service, can indicate their participation with the service by use of a brief verbal description announced by the call centre operator or by use of an introductory recorded message. For example, prior to connecting users with a call centre operator, many organizations provide a recorded message to inform callers of their privacy policy and advise that the content of the call may be recorded. In this instance, the same recorded message announcement could also inform the user that the organization participates with the Contact Details Registration Service and invite the user to avail themselves of the ability to communicate with the organization by use of their unique identification indicia.

In another aspect, the present invention provides a method for a related entity of a consumer service to obtain the contact details of a user of the consumer service, the user contact details being recorded in the database of a Contact Details Registration Service that has previously assigned a unique identification indicia to the user at the time of receiving the user's contact details wherein: the related entity submits a request to the Contact Details Registration Service database for the contact details of the user as recorded in the database, said request including at least the unique identification indicia of the user that was previously communicated to the related entity by the user; and the Contact Details Registration Service retrieving the user's contact details from the database and transmitting same to the related entity, wherein the Contact Details Registration Service database maintains a record of related entity requests for the contact details of the user.

In yet another aspect, the present invention provides a system for advising related entities of a consumer service of the contact details of a user including: a contact details data entry means to collect the contact details of a user, the data entry means being in electronic communication with a database to store the user contact details; a unique identification indicia generation means to generate a unique identification indicia and to transmit same to the user in electronic form said unique identification indicia also being stored and associated with the relevant user contact details stored in the database; and a user contact detail retrieval means to retrieve user contact details from the database upon receipt of a request including the unique identification indicia of the user in an electronic form; and a record maintenance means to maintain a record of related entity requests for the contact details of the user.

In a further aspect, the present invention provides a computer software program that enables a user of a consumer service to advise related entities of their contact details, the computer software program including: computer instruction code that establishes electronic communication between the user and a Contact Details Registration Service; computer instruction code that collects contact details from the user, including at least one address for correspondence; computer instruction code that allocates a unique identification indicia to the user, reports same to the user and stores the user's contact details and the associated unique identification indicia in a database; and computer instruction code that establishes electronic communications between a related entity and the Contact Details Registration Service and upon receiving a request from a related entity, analyzing said request to identify the unique identification indicia of the user, accessing the user's contact details and transmitting same to the related entity; and computer instruction code that maintains a record of related entity requests for the contact details of the user.

The techniques described herein may be embodied by stored executable instructions that are executed by one or more suitable processing devices such as personal or server computers.

The present invention provides a range of benefits to users and related entities that need to communicate with the user. In particular, the use of a unique identification indicia provides a significant benefit to users by saving them time when completing forms to provide their contact details to organizations and simultaneously reducing the potential for errors occurring during the recordal of those contact details. Further, embodiments of the invention save users a significant amount of time and effort when altering one or more of their contact details by requiring them only to record the alteration once. This is particularly convenient for users given the amount of time that is presently spent altering their contact details that usually requires the completion of numerous forms, phone calls and/or letters to advise all relevant related entities of their new details.

The present invention is also beneficial to organizations that need to communicate with users as the use of a unique identification indicia for each user substantially reduces the amount of data entry that is required by the organization. Further, replacing a large amount of contact details with a single unique identification indicia substantially reduces the risk of data entry errors. Further, the facility to obtain the full contact details of a user by the provision of the user's unique identification indicia to a Contact Details Registration Service database ensures that the organization has the latest up-to-date contact details for the user at any point in time that the organization requires those details.

This benefit gives rise to substantial additional benefits in that it avoids the time and effort that is usually required to process returned postal items indicating that a user is "no longer at this address". It is also possible to avoid a range of other indirect costs where an organization attempts to communicate with a user, recorded as being one of their customers, without knowledge of the customers contact details or some notification that the customer no longer wishes to receive correspondence from the organization.

Embodiments of the invention that provide a list of related entities to users at the time of a change to the user's contact details ensure that organizations are at least considered by the user for the purpose of formal notification of the change. The organization then either receives formal notification of the new contact details for the user or is advised that no further contact is required. In such cases, the organization further benefits as the change of contact detail notification may be automated which again saves data entry and processing time (e.g. call centre staff or mail processing) and reducing the potential for errors. In the event that a user indicates that they do not require any further contact from the organization then the organization does not incur wasted expenditure in future attempts to contact the user. In some embodiments of the invention, entities for which there is a legal requirement to notify them of a change to contact details may be automatically notified and/or be able to access up to date contact details. These entities may include Government Departments such as those that maintain electoral roles or motor vehicle registration details, etc.

Other systems, methods and features of the invention will become, apparent to one with skill in the relevant field of technology upon examination of the following figures and detailed description. It is intended that all such additional systems, methods and features included within this description, be within the scope of the invention and be protected by the following claims.

BRIEF DESCRIPTION OF THE DRAWINGS

One or more embodiments of the invention are described below with reference to the accompanying figures in which.

DESCRIPTION OF EMBODIMENTS OF THE INVENTION

Figure 1:
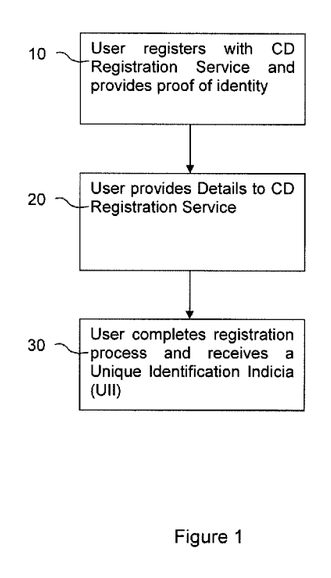
FIG. 1 is a flow chart detailing the steps of the user registering their details with a Contact Details Registration Service.

The process begins with a user registering with a Contact Details (CD) Registration Service. With reference to FIG. 1, this process commences at step 10.

An embodiment of the invention will be described with reference to a postal service where the CD Registration Service is used to provide users of the postal service with up-to-date address details of intended recipients of postal items. Of course, in this embodiment, there can be multiple forms of address as required/applicable, such as home address, street address, postal address, work address, post office address, etc. In alternative embodiments of the invention, other contact details may be relevant such as contact phone numbers and/or electronic mail addresses. The use of consumer services that require additional or alternative contact details should be considered equally within the scope of this invention despite the following detailed description being restricted to an embodiment relating to a postal service.

At step 20 of FIG. 1, the user provides all of their contact details to the CD Registration Service. The registration process is expected to require the user to supply all of the contact details and proof of identity in order to complete the registration process and thus receive a unique identification indicia (UII) (refer step 30).

Figure 2:
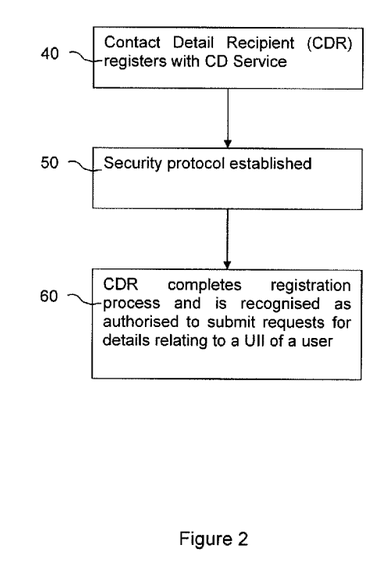
FIG. 2 is a flow chart detailing the steps of a Contact Detail Recipient (CDR) registering with a Contact Details Registration Service.

With reference to FIG. 2, it is expected that Contact Detail Recipients (CDR's) would be expected to prove their identity to the CD Registration Service to enable them to commence registering with the service (refer step 40). In addition to proving their identity, the CDR would also provide their full contact details to the service and in the instance of a commercial organization, it is likely that multiple types of address would be permitted (e.g. street address, shipping address, post office box address, etc). Assuming that a CDR is able to satisfy the identification requirements, a security protocol is then established (refer step 50) for the purpose of communications between the CDR and the CD Registration Service. A security protocol would most likely include a requirement to encrypt data communications between the CDR and the CD Registration Service and the requirement to provide details of any other security measures to ensure that user's contact details are not inappropriately supplied to non authorized CDR's.

At step 60, the CDR completes the registration process and is subsequently recognised as being authorized to submit requests for contact details relating to a UII of the user.

The UII for users could comprise numeric and/or alphabetic characters although it is expected that they would need to be of a length sufficient to allow UII's to be generated for the expected total number of CD Registration Service users whilst remaining as short as possible for ease of memorizing, for example, "AID54365".

Having obtained a UII, a user may then complete the contact details section of forms and/or documents belonging to an entity that is a registered CDR by only providing their UII. This process is detailed in FIG. 3 wherein at step 100, a user who has registered their contact details with the service is required to complete a form belonging to an entity that is a registered CDR and in so doing, the user completes that portion of the document requiring the user's contact details by providing only their UII. In this instance, it is expected that the entity that is registered with the CD Registration Service would indicate this facility to users by the use of a graphical icon (as some other form of visual identification) on their forms and/or documents. At this stage the user benefits by a reduction in the amount of time required to complete the form.

Figure 3:
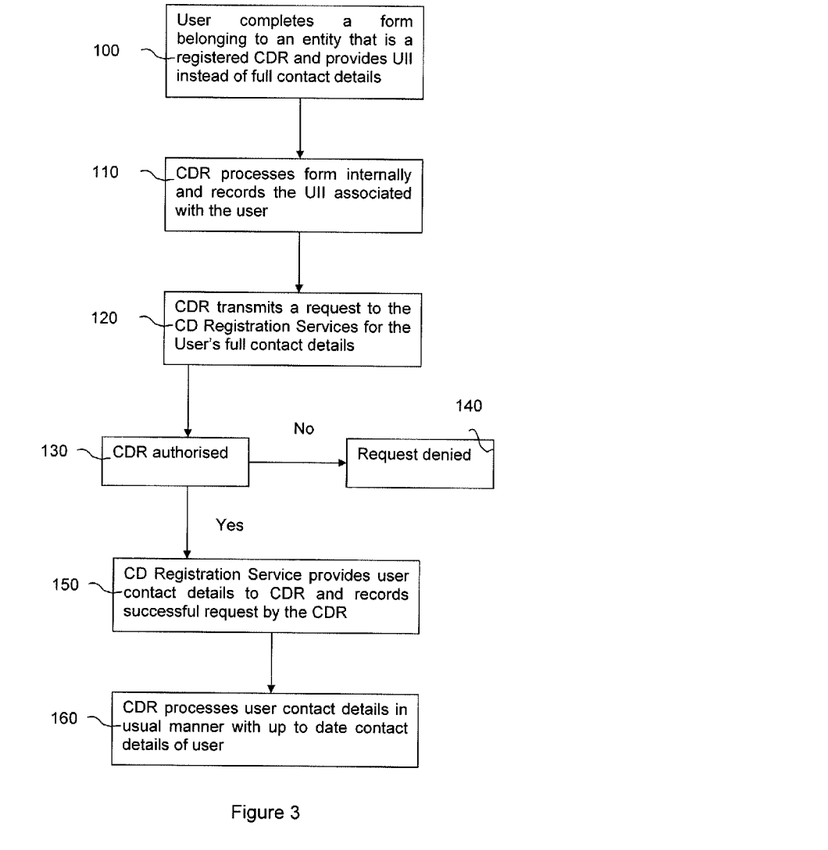
FIG. 3 is a flow chart detailing the steps of a user interacting with a CDR.

At step 110, the CDR processes the form internally and records the UII associated with the user who has completed the documents. At this stage in the process, the CDR gains a significant benefit as a result of internally recording the user's contact details by only recording the UII associated with the user. Although there may be data entry errors associated with recording a user's UII, this process will clearly be less prone to errors as compared with attempting to record all of the user's contact details and will also significantly reduce the data entry effort of the CDR.

At a point in time where the CDR is required to send an item of post to the user, they will require the user's up-to-date physical address. The CDR may wait until they actually need to send an item of post, but they may also decide to retrieve the address details immediately upon entering the UII, as organizations often require, or prefer, user's address details for reasons other than sending items of post (e.g. demographic/customer profiling studies or statutory/regulatory requirements). Accordingly, at step 120, the CDR transmits a request to the CD Registration Service to obtain the user's physical address details in order to send a postal item to the user.

Once a CDR has received a completed form, they will seek to enter the details into their internal computer system to record the relevant information pertaining to the user including the user's UII and the details of the sale of a product and/or service. In the case of a computer based form (e.g. on-line forms) the information is provided to the CDR in electronic form so manual data entry is not required. In the case of paper based forms, the CDR may utilise Optical Character Recognition (OCR) technology in order to convert hand written responses into electronic form.

Irrespective of the method used, the final result is that the CDR has the information provided by the user, including their UII, in electronic form in an internal computer system. Using a computing technology such as "web services" the CDR's computer system can send a request to the CD Registration Service to obtain the physical address details that correspond with the user's UII.

Web services are a computing technology that, amongst other things, provides the necessary standards, procedures, hardware and software to permit the automatic and secure request and provision of data between two otherwise independent computer systems. Being a standard technology, web services can be used for a wide range of applications although for any such requests to function correctly, the CDR must have previously registered with the CD Registration Service and passed the relevant security checks as applied by the CD Registration Service.

At step 130, the CD Registration Service determines whether the CDR is sufficiently authorized. If the request for a user's address details fails, the process diverts to step 140 wherein the request is denied and the CDR is notified accordingly. However, in the event that the request for a user's address details is permitted, the process proceeds to step 150 where the CD Registration Service provides the relevant requested user contact details to the CDR and records the details of the CDR along with the details of the successful request for the user's address details. Upon receipt of a web service request, the CD Registration Service retrieves the address details for the UII and using the same web services technology, the CD Registration Service may transmit the details back to the CDR. The address details are then stored and processed by the CDR's internal computer system.

In some instances, CDR's may require a user's physical address in advance of their need to send any postal items to the user. An example of this requirement would be insurance companies that need to obtain the address details of the user as part of the assessment of insurance risk or alternatively, various organizations may be required by law to actually record the physical address details of their customers in their internal computer systems. In any event, at any point in time where a CDR requests the address details of the user, the CD Registration Service records the submission of a successful request and the transmission of the user's address details to the CDR.

The recordal by the CD Registration Service of the CDR successfully requesting the address details of a user allows the CD Registration Service to subsequently provide a list to the user of all CDR's that have previously requested their address details and presumably sent items of post to the user. However, for internal purposes, in an embodiment of the invention, unsuccessful requests by CDR's for a user's address details are also recorded to allow repeated unsuccessful attempts to be subsequently investigated as they could represent a willful attempt to fraudulently obtain the address details of the user. Accordingly, in an embodiment, unsuccessful requests for a users address details are recorded for internal purposes and may possibly be shared with the user in the event that further investigation is required.

With reference again to FIG. 3, at step 160 the CDR, having obtained the users address details, processes the postal item in the usual manner with the reassurance that they have obtained the up-to-date address details of the user to whom they are sending a postal item. Of course, the CDR does not need to request the user's address details each time they send a postal item. In an embodiment, the CDR is only required to request the details once and can then rely upon a notification service to advise them of any change to the contact details of a user. Accordingly, at any given point in time, a CDR can be confident they have the latest address, without needing to check details each time an item of post is to be sent.

At some point in time, a user will change one or more of their contact details and in the particular example described, where they change their physical address details, related entities that are also users of the postal service will need to be advised.

Figure 4:
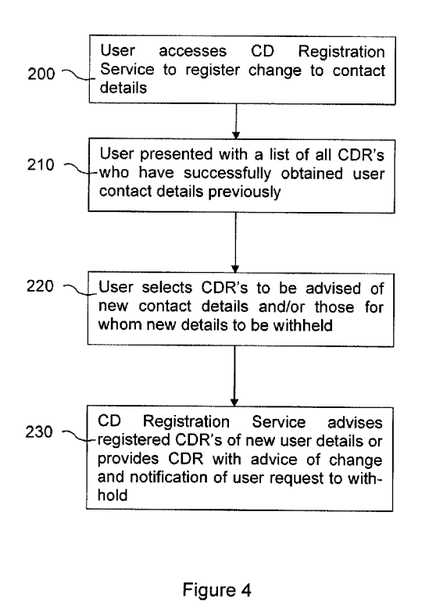
FIG. 4 is a flow chart detailing the steps associated with a user altering one or more of their contact details.

With reference to FIG. 4, when a user wishes to notify the CD Registration Service of a change of their address details, they access the CD Registration Service to register that change (refer step 200).

Upon selecting the appropriate CD Registration Service function (step 210), the user is then presented with a listing of all CDR's who have successfully previously obtained the user's address details. The listing of all CDR's who have previously obtained the user's address details at least include all entities that have previously transmitted items of post to the user. The listing is provided to the user to enable them to allow the formal notification of their change of address details to the CDR's in the list. As it is most likely that users will simply elect to notify all CDR's of their new address details, the default option is preferably for all CDR's to be notified of the change.

However, in an embodiment, the user is provided with the facility to select various CDR's and exclude them from formal notification of their new address details. This may occur in instances where a user is receiving postal items from a CDR from whom they do not wish to receive any further items of post (e.g. mail order catalogues, etc). Whilst users are generally provided with the facility to formally notify entities that they no longer wish to receive items of post from them, at the time of changing their physical address details, a user may decide to use that particular opportunity to make a decision regarding all the entities from whom they no longer wish to receive items of post (refer step 220).

Upon obtaining a list of all the CDR's that the user wishes to formally notify of the change to their address details, the CD Registration Service generates and transmits the formal notification (refer step 230).

In an embodiment, the formal notification to CDR's of a users new physical address details also occurs as a web service call to the computer system of the CDR, with the provision of the user's UII and the new address details as parameters of the call. The formal notification process may be fully automated and thus does not require any manual intervention, thereby further reducing the manual data entry requirements of the CDR in keeping their records of users' address details up-to-date.

Of course, step 230 may be omitted in embodiments where CDR's would immediately obtain up-to-date address details at the point in time in which they intend to transmit postal items to the user. However, in view of the requirement of some CDR's to maintain up-to-date physical address details of their customers irrespective of their requirements with regard to transmitting items of post, step 230 allows such CDR's to fulfill any statutory or regulatory compliance. Further, in embodiments where there is a desire to avoid a large communication infrastructure demand at the time of sending postal items to a large number of users, step 230 would be included.

Further, for CDR's that have been selected by the user for exclusion from the list of CDR's to be formally notified of their change of address details, these CDR's may either be formally notified in a similar manner to the CDR's that will be provided with the users new address details, or they may receive a relevant notification at the next point in time that those particular CDR's seek to obtain a users physical address details for the purpose of transmitting items of post.

Of course, whilst the above example relates primarily to physical address details and use of the postal service, the invention is equally applicable to other forms of contact information or other forms of personal information commonly entered in forms and/or documents. In addition to reducing potential errors and the manual data entry requirements of CDR's, the provision of a single UII to a user also has the beneficial effect of reducing the user's time requirement to complete forms and documents with respect to the provision of their contact details.

In addition to organizations registering as a CDR, users may also register as a CDR in order to obtain formal notification of any change to the contact details of another user with whom they wish to communicate.

Although postal services may not have sufficient optical character recognition technology to accurately translate hand written address details into electronic form, it may be possible for the existing OCR technology utilised by postal systems around the world to translate a sufficiently configured UII into electronic form with minimal potential for erroneous translation. In this instance, by effecting the necessary changes to existing postal system information technology and postal processing facilities, items of post could be transmitted to users by use of their UII only on an external surface of an item of post with the postal system OCR technology translating the handwritten UII into electronic form and submitting a request to the CD Registration Service to obtain the corresponding up-to-date physical address.

The translation of a UII on an external surface of an item of post to a physical address could involve the printing of the physical address onto an adhesive label that would subsequently be applied to an external surface at the time of processing the postal item to enable a delivery agent to deliver the item of post to the physical address. Alternatively, the translation of a UII into a corresponding physical address could be effected by the delivery agent by sufficiently equipping the delivery agent with the necessary technology to scan the handwritten UII and submit the necessary request to the CD Registration Service and obtain the corresponding physical address.

It will be appreciated by persons skilled in the relevant field of technology that numerous variations and/or modifications may be made to the invention as detailed in the embodiments without departing from the spirit or scope of the invention as broadly described. The present embodiments are, therefore, to be considered in all aspects as illustrative and not restrictive.

What is claimed is:

1. A computer-implemented method comprising:
receiving, by one or more computing devices, data indicating contact information associated with a validated, mail-receiving user of a contact details registration service;
in response to receiving the data indicating the contact information, providing, by the one or more computing devices, a unique passphrase to the validated, mail-receiving user of the contact details registration service;
receiving, by the one or more computing devices and from a particular, validated, mail-sending user of the contact details registration service, a request for the contact information associated with the validated, mail-receiving user of the contact details registration service, the request including the unique passphrase of the validated, mail receiving user of the contact details registration service;
determining, by the one or more computing devices, that the particular, validated, mail-sending user is authorized to receive the contact information associated with the validated, mail-receiving user based on the request;
in response to determining that the validated, mail-sending user is authorized to receive the contact information associated with the validated, mail-receiving user based on the request, providing, by the one or more computing devices, the contact information associated with the validated, mail-receiving user to the particular, validated, mail sending user;
receiving, by the one or more computing devices, a request to update the contact information from the validated, mail-receiving user of the contact details registration service, the request including updated contact information;
in response to the request to update the contact information from the validated, mail-receiving user of the contact details registration service, providing, by the one or more computing devices, to the validated, mail-receiving user, a list of validated, mail-sending users, including the particular, validated, mail-sending user, that have provided the unique passphrase;

receiving, by the one or more computing devices, data indicating a selection, by the validated, mail-receiving user, of a subset of the validated, mail-sending users; and in response to receiving the data indicating the selection of the subset of the validated, mail-sending users, providing, by the one or more computing devices, the updated contact information to one or more validated, mail-sending users of the subset.

2. The method of claim 1, wherein providing to the validated, mail-receiving user, a list of validated, mail-sending users, including the particular, validated, mail-sending user, that have provided the unique passphrase, comprises:

determining validated, mail-sending users that have provided the unique passphrase; and generating the list of validated, mail-sending users, including the particular, validated, mail-sending user, that have provided the unique passphrase based on the determined validated, mail-sending users that have provided the unique passphrase.

3. The method of claim 2, wherein determining validated, mail-sending users that have provided the unique passphrase comprises:

determining validated, mail-sending users that have provided the unique passphrase and that were previously authorized to receive the contact information associated with the validated, mail-receiving user.

4. The method of claim 1, further comprising:

in response to receiving the data indicating the selection of the subset of the validated, mail-sending users, providing a notification to one or more validated, mail-sending users that are not part of the subset that the validated, mail-receiving user has withheld the updated contact information.

5. The method of claim 1, wherein providing the updated contact information to one or more validated, mail-sending users of the subset comprises:

providing the updated contact information to one or more validated, mail-sending users of the subset without the one or more validated, mail-sending users of the subset requesting the updated contact information.

6. The method of claim 1, wherein providing the updated contact information to one or more validated, mail-sending users of the subset comprises:

providing one or more validated, mail-sending users of the subset a notification of the updated contact information; and providing the updated contact information to the one or more validated, mail-sending users of the subset in response to one or more requests for the updated contact information from the one or more validated, mail-sending users of the subset.

7. The method of claim 1, wherein the unique passphrase comprises alphanumeric characters.

8. The method of claim 1, wherein the contact information comprises a street mailing address.

9. A system comprising:

one or more computers and one or more storage devices storing instructions that are operable, when executed by the one or more computers, to cause the one or more computers to perform operations comprising:

receiving data indicating contact information associated with a validated, mail-receiving user of a contact details registration service;

in response to receiving the data indicating the contact information, providing a unique passphrase to the validated, mail-receiving user of the contact details registration service;

receiving, from a particular, validated, mail-sending user of the contact details registration service, a request for the contact information associated with the validated, mail-receiving user of the contact details registration service, the request including the unique passphrase of the validated, mail-receiving user of the contact details registration service;

determining that the particular, validated, mail-sending user is authorized to receive the contact information associated with the validated, mail-receiving user based on the request;

in response to determining that the validated, mail-sending user is authorized to receive the contact information associated with the validated, mail-receiving user based on the request, providing the contact information associated with the validated, mail-receiving user to the particular, validated, mail-sending user;

receiving a request to update the contact information from the validated, mail-receiving user of the contact details registration service, the request including updated contact information;

in response to the request to update the contact information from the validated, mail-receiving user of the contact details registration service, providing to the validated, mail-receiving user, a list of validated, mail-sending users, including the particular, validated, mail-sending user, that have provided the unique passphrase;

receiving data indicating a selection, by the validated, mail-receiving user, of a subset of the validated, mail-sending users; and in response to receiving the data indicating the selection of the subset of the validated, mail-sending users, providing the updated contact information to one or more validated, mail-sending users of the subset.

10. The system of claim 9, wherein providing to the validated, mail-receiving user, a list of validated, mail-sending users, including the particular, validated, mail-sending user, that have provided the unique passphrase, comprises:

determining validated, mail-sending users that have provided the unique passphrase; and generating the list of validated, mail-sending users, including the particular, validated, mail-sending user, that have provided the unique passphrase based on the determined validated, mail-sending users that have provided the unique passphrase.

11. The system of claim 10, wherein determining validated, mail-sending users that have provided the unique passphrase comprises:

determining validated, mail-sending users that have provided the unique passphrase and that were previously authorized to receive the contact information associated with the validated, mail-receiving user.

12. The system of claim 9, the operations further comprising:

in response to receiving the data indicating the selection of the subset of the validated, mail-sending users, providing a notification to one or more validated, mail-sending users that are not part of the subset that the validated, mail-receiving user has withheld the updated contact information.

13. The system of claim 9, wherein providing the updated contact information to one or more validated, mail-sending users of the subset comprises:
providing the updated contact information to one or more validated, mail-sending users of the subset without the one or more validated, mail-sending users of the subset requesting the updated contact information.

14. The system of claim 9, wherein providing the updated contact information to one or more validated, mail-sending users of the subset comprises:
providing one or more validated, mail-sending users of the subset a notification of the updated contact information; and
providing the updated contact information to the one or more validated, mail-sending users of the subset in response to one or more requests for the updated contact information from the one or more validated, mail-sending users of the subset.

15. The system of claim 9, wherein the unique passphrase comprises alphanumeric characters.

16. The system of claim 9, wherein the contact information comprises a street mailing address.

17. A non-transitory computer-readable medium storing software comprising instructions executable by one or more computers which, upon such execution, cause the one or more computers to perform operations comprising:
receiving data indicating contact information associated with a validated, mail-receiving user of a contact details registration service;
in response to receiving the data indicating the contact information, providing a unique passphrase to the validated, mail-receiving user of the contact details registration service;
receiving, from a particular, validated, mail-sending user of the contact details registration service, a request for the contact information associated with the validated, mail-receiving user of the contact details registration service, the request including the unique passphrase of the validated, mail-receiving user of the contact details registration service;
determining that the particular, validated, mail-sending user is authorized to receive the contact information associated with the validated, mail-receiving user based on the request;
in response to determining that the validated, mail-sending user is authorized to receive the contact information associated with the validated, mail-receiving user based on the request, providing the contact information associated with the validated, mail-receiving user to the particular, validated, mail-sending user;
receiving a request to update the contact information from the validated, mail-receiving user of the contact details registration service, the request including updated contact information;
in response to the request to update the contact information from the validated, mail-receiving user of the contact details registration service, providing to the validated, mail-receiving user, a list of validated, mail-sending users, including the particular, validated, mail-sending user, that have provided the unique passphrase;
receiving data indicating a selection, by the validated, mail-receiving user, of a subset of the validated, mail-sending users; and
in response to receiving the data indicating the selection of the subset of the validated, mail-sending users, providing the updated contact information to one or more validated, mail-sending users of the subset.

18. The medium of claim 17, wherein providing to the validated, mail-receiving user, a list of validated, mail-sending users, including the particular, validated, mail-sending user, that have provided the unique passphrase, comprises:
determining validated, mail-sending users that have provided the unique passphrase; and
generating the list of validated, mail-sending users, including the particular, validated, mail-sending user, that have provided the unique passphrase based on the determined validated, mail-sending users that have provided the unique passphrase.

19. The medium of claim 18, wherein determining validated, mail-sending users that have provided the unique passphrase comprises:
determining validated, mail-sending users that have provided the unique passphrase and that were previously authorized to receive the contact information associated with the validated, mail-receiving user.

20. The medium of claim 17, the operations further comprising:
in response to receiving the data indicating the selection of the subset of the validated, mail-sending users, providing a notification to one or more validated, mail-sending users that are not part of the subset that the validated, mail-receiving user has withheld the updated contact information.

21. The medium of claim 17, wherein providing the updated contact information to one or more validated, mail-sending users of the subset comprises:
providing the updated contact information to one or more validated, mail-sending users of the subset without the one or more validated, mail-sending users of the subset requesting the updated contact information.

22. The medium of claim 17, wherein providing the updated contact information to one or more validated, mail-sending users of the subset comprises:
providing one or more validated, mail-sending users of the subset a notification of the updated contact information; and
providing the updated contact information to the one or more validated, mail-sending users of the subset in response to one or more requests for the updated contact information from the one or more validated, mail-sending users of the subset.

23. The medium of claim 17, wherein the unique passphrase comprises alphanumeric characters.

24. The medium of claim 17, wherein the contact information comprises a street mailing address.

* * * * *